United States Patent [19]
Bank et al.

[11] B 3,989,292
[45] Nov. 2, 1976

[54] SEMI-PNEUMATIC ENERGY ABSORBING BUMPER SYSTEM FOR MOTOR VEHICLES
[75] Inventors: Thomas A. Bank, Carmel, Ind.; Jack E. Gieck; David A. Weitzenhof, both of Akron, Ohio
[73] Assignee: The Firestone Tire & Rubber Company, Akron, Ohio
[22] Filed: Feb. 25, 1975
[21] Appl. No.: 552,932
[44] Published under the second Trial Voluntary Protest Program on February 3, 1976 as document No. B 552,932.

Related U.S. Application Data
[63] Continuation-in-part of Ser. No. 426,615, Dec. 12, 1973, Pat. No. 3,902,748.

[52] U.S. Cl. .............................. 293/71 P; 267/140
[51] Int. Cl.² ...................................... B60R 19/10
[58] Field of Search ............... 293/1, DIG. 2, 71 R, 293/71 P; 267/116, 139, 140; 114/219

[56] References Cited
UNITED STATES PATENTS
2,731,290  1/1956  Corydon ........................... 293/71 P
3,768,850  10/1973  Barton et al ...................... 293/71 P
3,810,668  5/1974  Kornhauser ....................... 293/71 P

Primary Examiner—Evon C. Blunk
Assistant Examiner—Robert Saifer

[57] ABSTRACT

Disclosed is a semi-pneumatic energy absorbing bumper system for interposition between two objects at least one of which is movable including module means having an impacting face and upper, lower and side walls terminating in a continuous bead, support means for mounting said module means to at least one of said objects, a plurality of reinforcing ribs connecting only the impacting face to the upper and lower side walls, means for holding the module means against the support means to form a cavity therebetween closed to the atmosphere, and means for permitting selective communication between the cavity and the atmosphere upon the application of an external force of predetermined magnitude to the module means.

5 Claims, 11 Drawing Figures

SEMI-PNEUMATIC ENERGY ABSORBING BUMPER SYSTEM FOR MOTOR VEHICLES

CROSS REFERENCE TO RELATED APPLICATIONS

This application is a continuation-in-part of Ser. No. 426,615, filed Dec. 12, 1973, now U.S. Pat. No. 3902748.

BACKGROUND OF THE INVENTION

The present invention relates to energy absorbing bumpers specifically, a light weight bumper presenting a soft collision interface to objects on impact, and having a relatively wide, effective angle of collision acceptance. Although various fluids may be employed in such bumpers, the utilization of air as the working fluid not only produces a lighter weight assembly, but also obviates the need for seasonal maintenance which is necessary in some climates where liquids are employed.

Recent Department of Transportation (DOT) requirements have stimulated development of a suitable energy absorbing bumper system for motor vehicles. Although pneumatic energy absorbing bumper designs have been known since 1898, when they were first utilized with railway carriages, many of the present design proposals do not differ appreciably from the early configurations.

Generally, pneumatic bumpers absorb energy as they are compressed. Bumpers which are entirely closed offer increased resistance to compression, as they are subjected to increased forces of impact or peak loads, inasmuch as the latent air therein must actually expand the flexible structure. For this reason, static pressure within the bumper cannot be too high or the structure may rupture on impact. Alternatively, if the structure does not rupture, its lack of compression may permit damage to occur since the forces of impact will be transferred to both the impacted and the impacting object. Insofar as such bumpers contain no energy dissipating valving, whereby the compressed air may be released, they function primarily as energy storing devices rather than energy dissipating systems and as such tend to act as a spring, imparting a potentially harmful rebound effect immediately subsequent to impact with another object.

One relatively recent design involving a type of closed system pneumatic bumper is embodied in U.S. Pat. No. 3,810,668 and includes an inflatable bumpoer portion which is vented directly to a storage tank through suitable conduits. Prior to impact, pressures within the bumper and the tank are at equilibrium and immediately following impact, most of the working fluid is driven from the bumper to the tank with an increase in pressure therein. The fluid subsequently bleeds back into the bumper until equilibrium again obtains.

A pneumatic bumper which vents its air to another closed system such as a tank may be considered an improvement over the totally closed structure in some respects; however, certain problems with the former system are merely lessened and not eliminated. For example, upon compression of the flexible bumper, air is driven therefrom, but as more of that air is transferred to the tank and the pressure increases therein, the bumper itself resists further compression thereby limiting its capacity to absorb energy. Nor, can relatively higher static pressures be maintained in the bumper to tank system, inasmuch as both pressures must be at equilibrium prior to impact. If the air pressure within the bumper and tank are both relatively high in this context, e.g., greater than 10 psig, transfer of the air from the bumper to the tank becomes more difficult. Furthermore, the tank itself must be strong enough to resist rupturing, adding even more weight to the vehicle. Increased bumper weight, particularly when it is in the front bumper which necessarily is located forward of the front axle of a vehicle, contributes to problems such as increased tire wear and sluggish steering response.

Another relatively recent design involving a pneumatic bumper is embodied in U.S. Pat. No. 3,768,850 and includes a resiliently deformable bumper shell mounted on a supporting plate. A plurality of ribs extend from the inner walls of the bumper shell to the supporting plate where they are removably connected in grooves. Mounting of the ribs in the grooves and the bumper shell itself to the supporting plate produces a plurality of individual chambers, normally closed to the atmosphere. At the rear of each chamber is a pressure relief valve which vents increasing chamber pressures, encountered during impact, directly to the atmosphere. Subsequent to impact, the bumper slowly returns to its original shape by restricted flow of air through the valves and into the chambers.

Despite the ability of such a bumper to dissipate energy, i.e., by exhausting the air under pressure to the atmosphere, peak loading forces which compress the bumper are undesirably high due to its internal structure. That is, the configuration of the ribs, effectively connecting the front impacting face of the bumper shell to the rear supporting plate, inhibits the rate at which the bumper shell will collapse as well as increases the forces necessary to cause total collapse of the bumper. Insofar as energy absorption and dissipation are functionally dependent upon the compression, or rapid decrease of internal bumper volume, it is believed that absorption of energy in such a system will be performed primarily by the resilient bumper with a relatively small amount of the energy being absorbed by the air contained therein. Based upon experimental work and development of the present bumper system, as well as the system set forth in our parent application, Ser. No. 426,615, it has been found that greater amounts of energy may be dissipated by proper use of the air contained therein rather than relying solely on the elastomer itself.

Thus, it is believed that a bumper such as embodied in U.S. Pat. No. 3,638,985, which may be characterized as nonpneumatic in the sense that the interior of the bumper is always in direct communication with the atmosphere, would be incapable of dissipating a satisfactory amount of the energy that it absorbs upon impact inasmuch as neither air nor other working fluid could be utilized to any appreciable degree in such capacity. Total energy absorption and whatever dissipation may be obtained would be solely dependent upon the elastomeric nature of the material forming the bumper.

As pneumatic bumpers of either of the foregoing types inherently absorb energy during compression, the problem has been that to obtain a maximum degree of compression, the impacting or peak loading force which compresses the bumper is often so high that harmful forces are transferred during collision rather than absorbed because the bumper cannot be readily compressed.

SUMMARY OF THE INVENTION

It is therefore an object of the present invention to provide a semi-pneumatic bumper system which is readily compressed to a maximum degree at a lower peak loading force than existing pneumatic systems.

It is another object of the present invention to provide a semi-pneumatic bumper system which is relatively light in weight and utilizes ambient air as the working fluid.

It is still another object of the present invention to provide a semi-pneumatic bumper system having a soft collision interface surface and having a wide, effective angle of collision acceptance.

It is yet another object of the present invention to provide a semi-pneumatic bumper system which absorbs energy of impact and dissipates a higher percentage of that energy than existing bumper systems by venting of the working fluid through orifices of controlled size.

It is another object of the present invention to provide a semi-pneumatic bumper system which removes the energy of collision from the system by dissipating it to the atmosphere in a harmless form.

It is still another object of the present invention to provide a semi-pneumatic bumper system consisting of an elastomeric material which does not require internal reinforcement fabrics.

It is yet another object of the present invention to provide a semi-pneumatic bumper system which can be repeatedly impacted at below design speeds without damage to the motor vehicle or to the system itself.

It is another object of the present invention to provide a semi-pneumatic bumper system which can be interposed between a fixed object and a variety of vehicles and other objects.

These and other objects of the present invention, together with the advantages thereof over existing and prior art forms, which will become apparent from the following specification are accomplished by means hereinafter described and claimed.

In general the semi-pneumatic energy absorbing bumper system of the present invention may be interposed between two objects at least one of which is movable and includes elastomeric module means having an impacting face and upper, lower and side walls terminating in a continuous bead, support means for mounting said module means to at least one of said objects, a plurality of reinforcing ribs connecting only the impacting face to the upper and lower walls, means for holding the module means against the support means to form a cavity therebetween closed to the atmosphere, and means for permitting selective communication between the and the atmosphere upon the application of an external force of predetermined magnitude to the module means.

DESCRIPTION OF THE PREFERRED EMBODIMENT

Figures 1, 1A:
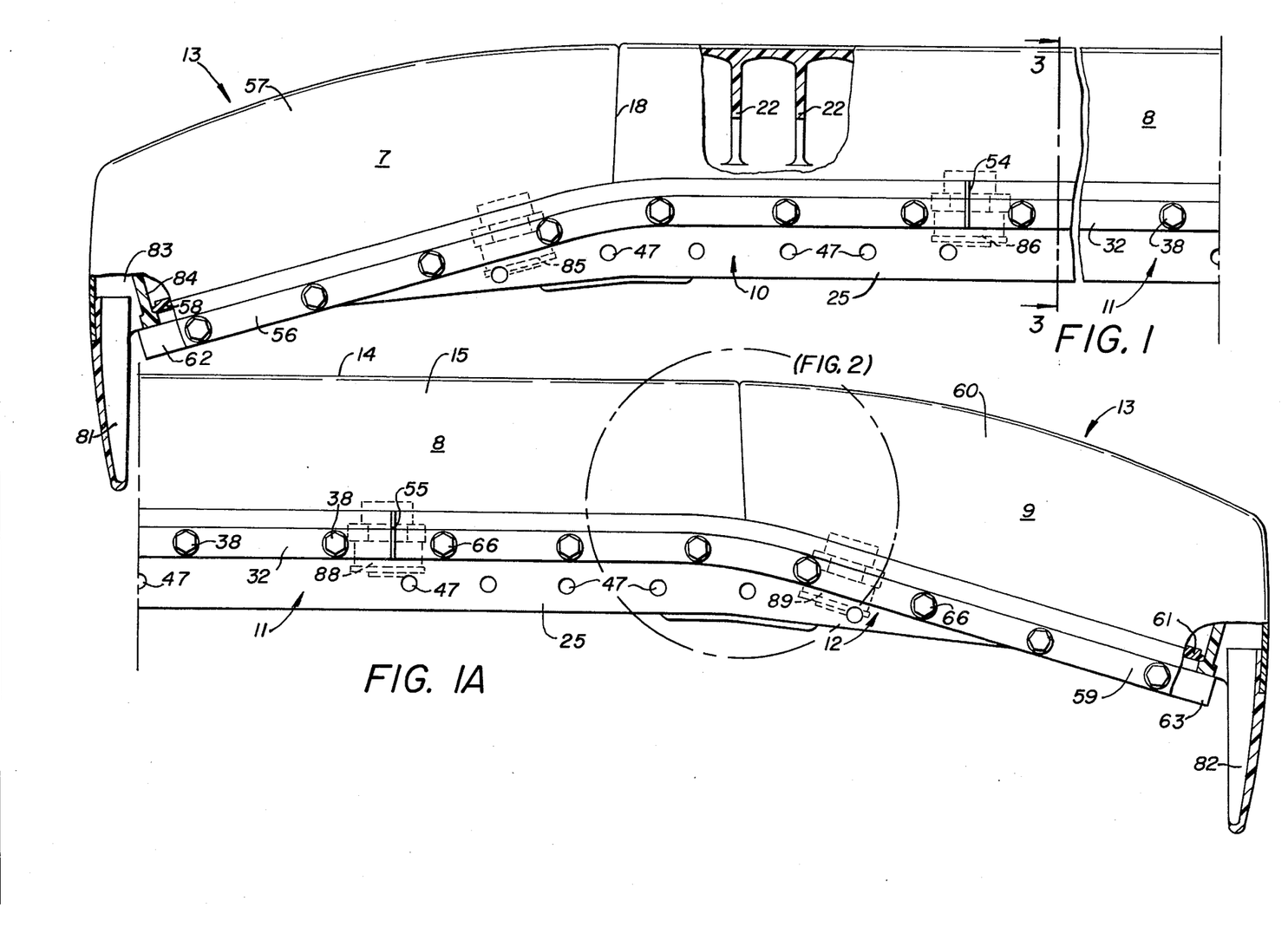
FIG. 1 is a top plan view partially broken away depicting the left half of the semi-pneumatic bumper according to the preferred form of the invention.
FIG. 1A is a top plan view depicting the right half of the semi-pneumatic bumper according to the preferred form of the invention.

The pneumatic energy absorbing bumper system, referred to generally by the numeral 6, and depicted in FIGS. 1–1A, includes three elastomeric bumper modules, a left side section 7, a center section 8, and a right side section 9. The preferred elastomeric material for the modules 7–9 is a special type of polyurethane described in a related copending patent application, U.S. Ser. No. 368,155, filed by our common assignee The Firestone Tire and Rubber Company, on June 8, 1973, and now abandoned, to which reference is made for such additional information on the material as may be required to practice the invention otherwise disclosed and described herein. The elastomeric material therein described has a high modulus on the order of ten to twenty times that of conventional elastomers and twice the tensile strength thereof, yet without sacrifice of elongation properties. The material is readily cast, according to known techniques, into the desired shape of the modules and requires no reinforcement fabric to be incorporated therein.

Each of the modules 7–9 is generally rectangularly shaped and forms a separate cavity with supporting structure referred to generally by numerals 10, 11 and 12 respectively, as described below. In the particular embodiment described herein, the three modules 7–9 form a continuous curved impacting interface, generally referred to by the numeral 13. Although differing somewhat in appearance and size, the modules 7–9 are functionally designed so as to be identical and therefore, all individual structural components of each will not be repeated. The overall appearance of the bumper system 6 as well as the use of three modules 7–9 is not intended to limit the scope of the invention, it being understood that the number of modules employed and their appearance is a mere matter of choice dictated primarily by the size and type of motor vehicle upon which it is mounted. As regards the motor vehicles, the bumper system 6 can actually be mounted on any vehicle such as buses, trucks, trailers, passenger cars and the like. Moreover, the bumper system 6 could readily be mounted on a boat or even on a stationary object such as a loading dock to effect collision protection and therefore, broadly, may be employed wherever conventional bumpers are currently utilized.

Referring again to the drawings, the center module 8 may be considered typical of the modules 7–9. The center module includes a front wall 14, an upper or top wall 15, a lower or bottom wall 16 (FIG. 3), a right side wall 17 (FIG. 2) and a left side wall, referred to as 18 in FIG. 1, but not visible. The configuration of the front wall 14 is designed so the middle portion thereof is somewhat thinner in cross section than the portions immediately adjacent it. Where the thickness of the wall 14 increases, lips 19 and 20 are formed which are intended to prohibit a conventional bumper from riding up on or under the module 8. As depicted in the drawings, the top and bottom walls 15 and 16, terminate in a bead 21 as do the left and right side walls 17 and 18, the bead 21 being continuous about the rear perimeter of the module 8.

A plurality of transverse or vertical reinforcing ribs 22 connect the inner surfaces of the front, upper and lower walls 14, 15 and 16, forming many interconnected compartments within the module 8. The ribs 22 generally contribute strength to the module 8 absorbing some of the force received upon impact. The rear edge 23 of each rib 22 has a semi-arcuate, semi-inclined configuration which forms a clearance space between the rib and the closure plate 24, upon which the module 8 is mounted. Thus, upon impact with an object, such as a conventional bumper, the front wall 14 is readily driven rearwardly without requiring instantaneous collapsing or buckling of the ribs 22 against the closure plate 24. In this manner, air contained within the cavity, is more readily compressed, with attendant absorption of energy. Although the ribs 22 are designed so as not to interfere with the collapse or crushing of a module 8, they do control bulging of the upper and lower walls, 15 and 16, as the front wall 14 is driven rearwardly by another object, and, without prohibiting the front wall 14 from forming a pocket into which the impacting or impacted bumper is buried.

The number of ribs 22 employed across the length of a module may vary depending upon the intended capacity of the bumper system. While not to be construed as limiting, the modules which have been evaluated thus far have had one rib at approximately every 2.5 inches. It is believed, however, that the ribs should not be so closely spaced as to form a nearly solid elastomeric bumper, nor so far apart that an object colliding with the bumper would avoid any of the ribs.

The center supporting structure 11 includes a module closure plate 24, upon which the center module 8 is mounted, and a backup structure 25 which provides structural integrity and transmits the forces of collision to the object or vehicle upon which it is mounted. The backup structure 25 also provides a suitable location for mounting brackets such as 26. Although the supporting structure 11 includes two elements, the closure plate 24 and the backup structure 25, it is entirely possible that both said elements could be combined as one integral structure, or even for the object or vehicle to be provided with the equivalent of the backup structure 25 and closure plate 24 permitting the module 8 to be mounted directly thereon. As depicted in FIGS. 1–1A, the backup structure 25 preferably extends across the length of the whole bumper system 6 upon which all three modules 7, 8 and 9 may be mounted.

The uppermost end 28 of closure plate 24 extends into a recess 29 which is formed in the inner side of wall 15, proximate the bead 21, when the module 8 is mounted on the plate 24. Similarly, the lowermost end 30 of plate 24 extends into a recess 31 also formed in the inner side of wall 16 during mounting of the module 8. An upper bead claim 32 engages the rear portion of the wall 15, proximate the bead 21 and has a downwardly extending lip 33 which forms a second recess 34 in the wall 15 opposite the recess 29. The foot 35 of bead clamp 32 reposes against a rearwardly extending flange 36 carried by the closure plate 24. The bead clamp 32 is firmly fastened to the flange 36 as with bolts and nuts, 38 and 39, at suitable intervals along the length of upper wall 15. The bolts also pass through the backup structure 25 securing it to the flange 36.

Similarly, at the lower wall 16, a lower bead clamp 40 engages the rear portion of the wall, proximate the bead 21 and has an upwardly extending lip 42 which forms a second recess 41 in the wall 16 opposite the recess 31. The foot 43 of bead clamp 40 reposes against a rearwardly extending flange 44 formed in the closure plate 24 and is firmly fastened thereto, as is the backup structure 25, by a plurality of bolts and nuts, 45 and 46, at suitable intervals along the length of lower wall 16 in the same manner as previously described in conjunction with bead clamp 32. Upon tightening of the bolts the bead clamps 32 and 40 hermetically seal the middle third of the upper and lower walls 15 and 16 of the module 8 to the closure plate 24.

Figure 3:
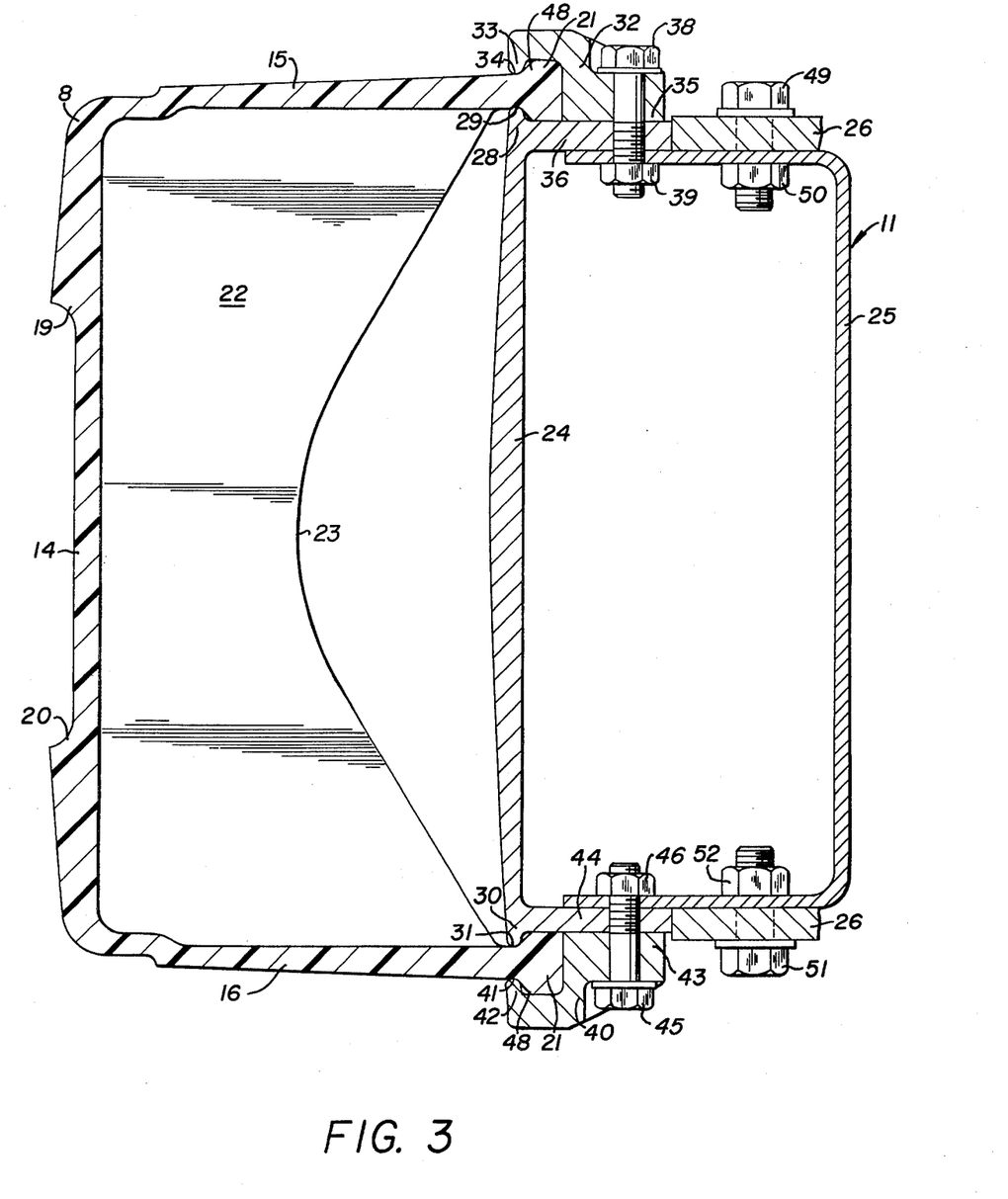
FIG. 3 is an enlarged cross section taken substantially along the line 3—3 in FIG. 1.

As depicted in FIG. 3, the bead 21 has inclined leading edges 48, preferably bearing a 45° surface distal to the recesses formed in the upper and lower walls 15 and 16 when the module 8 is mounted on the support plate 24. The inclined surfaces 48 offer increased resistance to any unintentional withdrawal of the bead 21 from between the clamps 32 and 40 and the closure plate 24, which might otherwise occur during severe impact.

The mounting bracket 26, when one is utilized, may be conveniently attached to the backup structure 25 with bolts and nuts 49, 50 and 51, 52, which pass through suitable bores 47 (FIGS. 1–1A) provided in backup structure 25. The bracket 26 may be directly attached to the object or vehicle or may itself be an integral part thereof. Moreover, on various objects and vehicles, the backup structure 25 could readily be mounted to other support members in a variety of ways.

Figure 2:
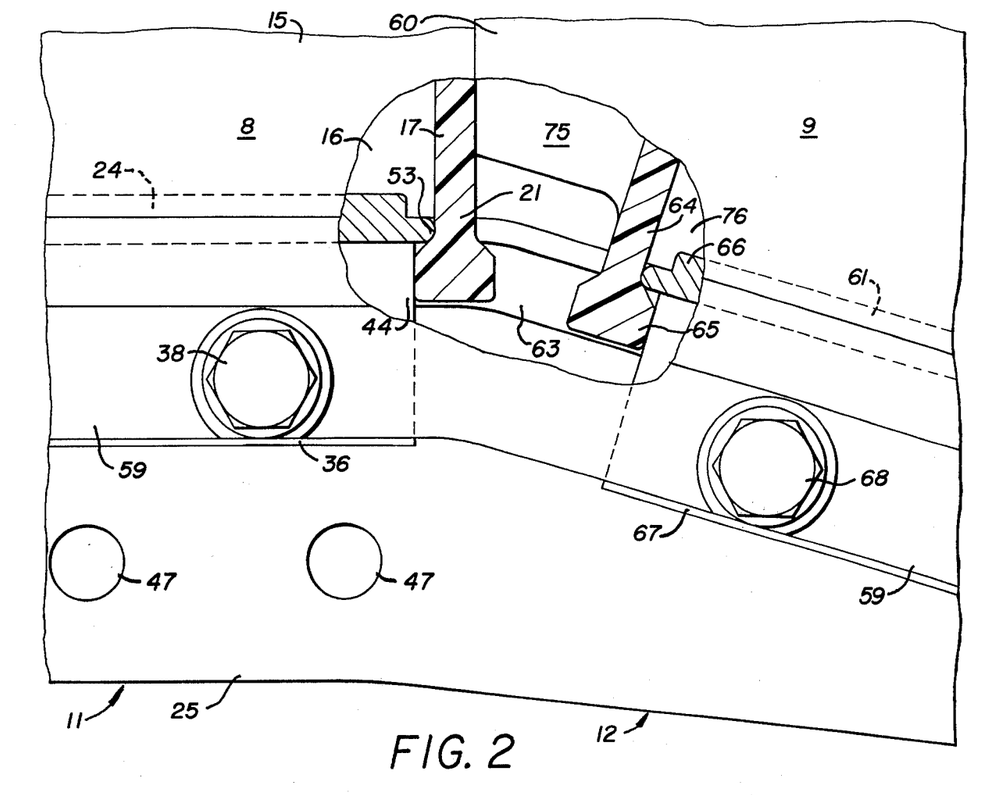
FIG. 2 is a modified enlarged view, partially in section, of the area within the chain line circle appearing in FIG. 1A.

The bead 21 at the side walls 17 and 18 of module 8 is not mounted between the closure plate 21 and any bead clamps. Referring specifically to FIG. 2, the right end 53 of closure plate 24 reposes against the inner side of the wall 17 preferably adjacent the bead 21. A similar arrangement along the side wall 18 prevails and although the closure plate 24 is in physical engagement with the walls 17 and 18, the module 8 is not hermetically sealed to the atmosphere. Although sealing could be readily effected with bead clamps comparable to clamps 32 and 40, by not sealing these walls, a means or space through which the air inside the module 8 can communicate with the atmosphere is provided during impact of the module. It is to be understood that this means of venting around the bead area could be the only communication with the atmosphere or that other clamping could be selected to accomplish less than hermetic sealing. The specific embodiment set forth herein has been found to be particularly efficient in dissipating a maximum amount of the energy absorbed upon impact.

As depicted in FIGS. 1–1A, the upper bead clamp 32 covers the middle third of the module 8 and terminates at ends 54 and 55. An upper clamp 56 fastens the upper wall 57 of the module 7 to a closure plate 58 and extends over the left hand upper wall 15 of module 8 to the bead clamp 32. Another upper bead clamp 59 fastens the upper wall 60 of the module 9 to a closure plate 61 (FIG. 2) and also extends over the right hand upper wall 15 of module 8 to the bead clamp 32. Lower bead clamps 62, 43 and 63 extend over the lower walls of modules 7, 8 and 9, respectively, to secure the beads against the closure plates.

The left and right modules 7 and 9 are mounted in an identical manner to the module 8 and also carry ribs such as 22 described in conjunction with module 8. In FIG. 2, a portion of that mounting is depicted for the right module 9 having a side wall 64 terminating in a bead 65. The supporting structure 12 includes the backup structure 25 (FIG. 1A) and the closure plate 61 having an end 66 which reposes against the inner side of the wall 64, preferably adjacent the bead 65. The bead 65 is continuous about the rear of module 9 as is the bead 21 in module 8. The upper bead clamp 59 secures the bead 65 against the rearwardly extending flange 67 of closure plate 61 and is held there with bolts 68 and nuts to effect hermetic sealing of the module 9 along the upper wall as described in conjunction with the module 8. Similar sealing is accomplished with the lower bead clamp 63.

Also depicted in FIG. 2 is a substructure 75 extending laterally of the side wall 64 proximate the side wall 17 of center module 8. The substructure 75 permits the right module 9 to be angularly disposed from the center module 8 and yet maintain a continuous impacting interface 13. The upper wall 60 of module 9 is therefore continuous with the upper wall 15 of module 8 although the area between side walls 17 and 64 is not hermetically sealed, as shown. The lower wall 76 of module 9 is also continuous with the lower wall 16 of module 8. A similar substructure (not shown) extends laterally from the side wall of module 7.

The left and right modules 7 and 9 also have rearwardly extending wings, 81 and 82, respectively, as depicted in FIGS. 1 – 1A. The structure of the left module wing 81 is detailed in FIG. 1 and it is there seen to be rearwardly extending from a substructure 83 adjacent inner wall 84. The inner wall 84 physically engages a closure plate 58 as described in conjunction with module 8. The wing 81, which may be cemented to the substructure 83 functions to conceal the supporting structure 10 and to afford at least a modicum of protection to the vehicle from lateral scrapes and blows thereto. The wing 81 also acts as an anti-hooking cam surface lessening the change of the system 6 being caught on an object when the vehicle is backing up, and it protects brushes in automatic vehicle washing apparatus from being damaged.

Each of the modules in the bumper system 6 is designed to permit slight compression of the ambient air contained therein upon impact with another object to a predetermined pressure, e.g., 1 psig or less, and then to release all or part of the air at a controlled rate with the next increment of pressure increase. To effect this release, in addition to the passageway between the modules' side walls and respective closure plates, the modules are designed to have pressure release valves, burst diaphragms, or similar devices such as a simple flap valve. As depicted in FIGS. 1–1A, the module 7 has one release valve 85, the module 8, two release valves 86 and 88 and the module 9, one release valve 89. Each of the release valves is threadably engaged with the closure plate providing a direct communication between the air within the module and the atmosphere during pressure relief.

Figure 4:
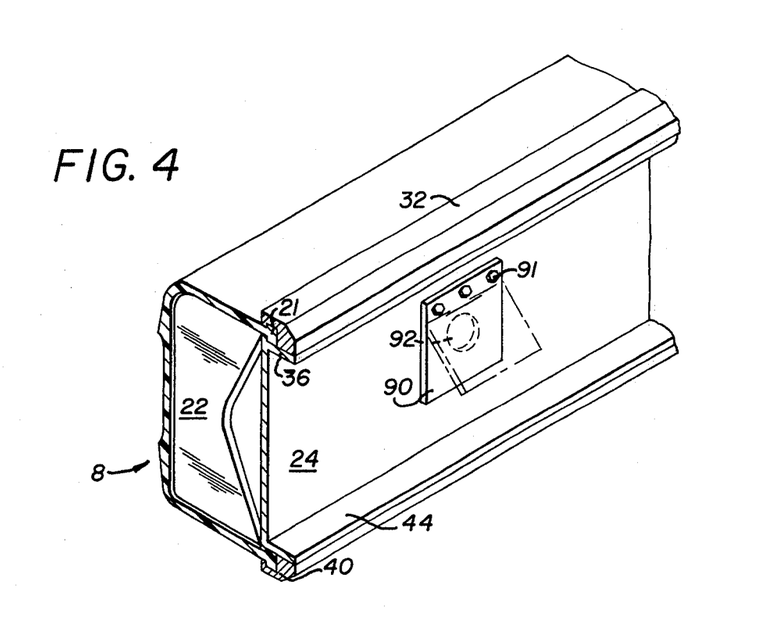
FIG. 4 is a perspective view of a portion of the semi-pneumatic bumper according to the present invention, depicting a means of communication between the air inside of a module and the atmosphere; and, FIGS. 5–10 represent load deflection curves obtained in pendulum tests conducted with one module of the pneumatic bumper of the present invention.
Figure 5:
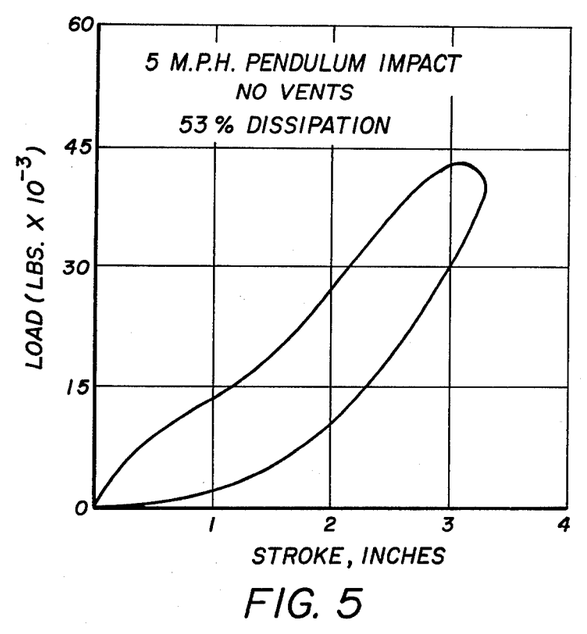
Figure 6:
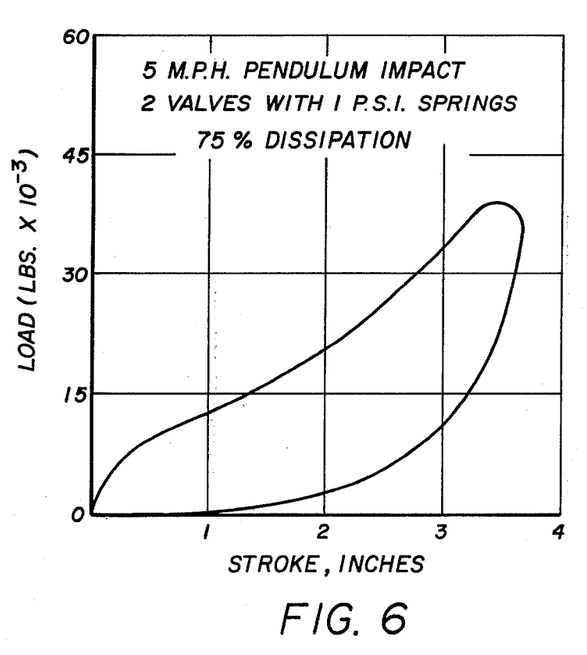
Figure 7:
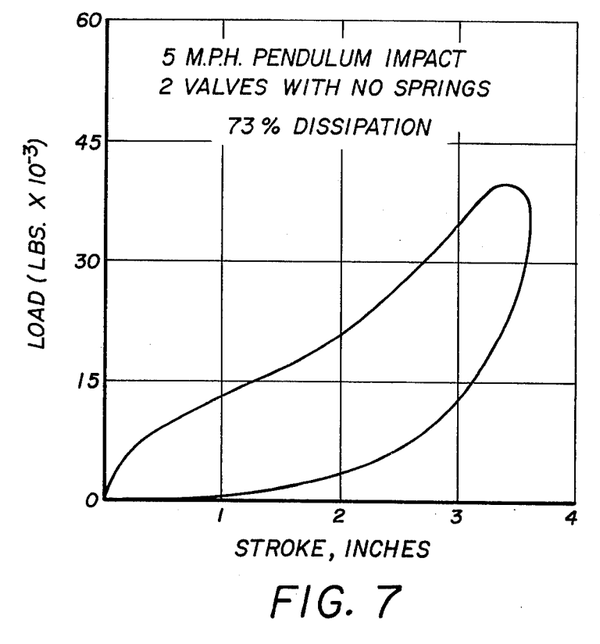
Figure 8:
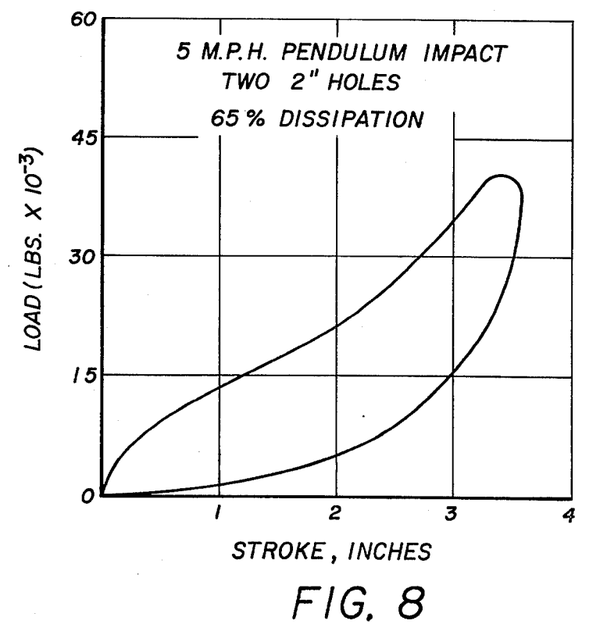
Figure 9:
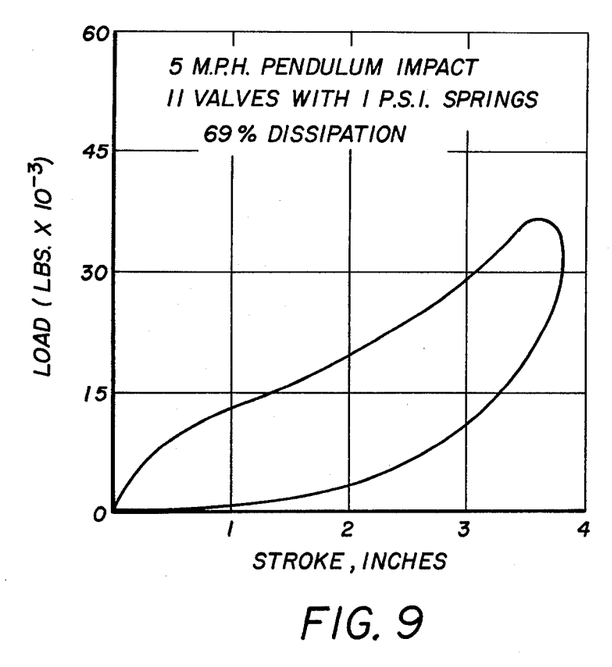
Figure 10:
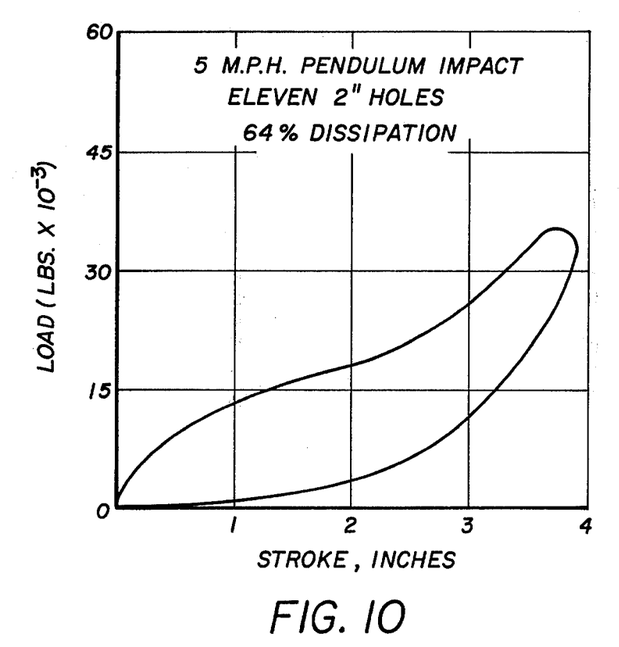

The more simple flap valve 90, depicted in FIG. 4, is preferably constructed of a resilient material such as the elastomer employed for the modules, nylon or other rubbery material. Such a valve may be readily fastened to the closure plate 24 via screws 91 and in its normal closed position covers an aperture 92 passing through the plate 24 through which air may escape. During impact, sufficient to compress the ambient air within the module 8, the valve 90 is urged to an open position, depicted in phantom, permitting the air to pass rapidly through the aperture 92. Subsequent to impact, as the module returns to its normal shape, air slowly bleeds into the module, through the weak seal between the valve 90, now in its closed position, and the closure plate, as well as around the bead areas.

Irrespective of the valve employed, pressure release or flapper, its purpose it twofold. First, it functions to meter the amount and control the rate at which air exits from the module thereby regulating and preferably maximizing the absorption and subsequent dissipation of energy. Secondly, the valve restricts the return flow of air into the module to prohibit potential rebound which can be harmful and which is characteristic of closed pneumatic and solid elastomeric systems.

Existing bumper systems utilize a liquid working fluid such as water, or they are pneumatic, utilizing air or other compressible gas. Unlike the liquid systems which are relatively incompressible and must vent pressure immediately and the closed air systems which do not vent to the atmosphere, the present system 6 provides a maximum of energy absorption by permitting initial compression of air within the module followed by the quick release of the pressure to dissipate the energy. It has been observed that venting too rapidly results in inadequate absorption while no venting may result in transfer of most of the impacting energy directly to the vehicle with a minimum of energy absorption and little or no dissipation.

To evaluate the effectiveness of the disclosed bumper system with zero static inflation pressure, utilizing the captive ambient air, as well as elastomer stiffness, for absorbing and dissipating energy, two series of tests were run. To obtain data on a variety of systems without the intrusion of effects of vehicle frames or suspension, a first series of tests was run at various speeds on a pendulum apparatus. A second series of tests was run using a 1955 GMC TDH-5106 test bus, weight 19,200 pounds, in impacts at various speeds with a concrete barrier or one of several test automobiles.

The former, pendulum tests were conducted with two pendulum baskets, each capable of being loaded to 15,000 pounds with reinforced concrete weights held rigidly behind the front (impacting) face. Each basket was suspended from four 30 foot cables, with a geometry that provided controlled parallel motion of the masses while swinging.

The 15,000 pound mass chosen represents half the weight of the heaviest of current buses under maximum overload conditions. Although it is anticipated that three bumper modules tailored to the individual bus would ordinarily be mounted across the front of the vehicle, the styling geometry of present buses makes it likely that, in a barrier crash, the equivalent of two modules of the size tested would be effectively exercised. Thus, at this half-bus mass, a single module was mounted to impact squarely the face of the mating pendulum.

The secondary (impacted) pendulum was instrumented behind the bumper with a pair (one on either side) of electronic Statham strain gage-type accelerometers having a range of plus or minus 100 g. Instantaneous pressure inside the module was measured by a strain gage-type pressure transducer of 0–200 psi range. Voltages produced by both kinds of transducers were fed into individual integral power supply amplifiers.

Instantaneous stroke was monitored by means of a pair of double-acting linear potentiometers which terminated in Alnico magnets, these being positioned to grip the surface of a steel plate extending laterally from the impacting pendulum face upon contact with the bumper. These magnets also provided the capability of instantaneous release after completion of the unloading stroke as the pendulums separated. The outputs were recorded on a 7-channel Ampex tape recorder operating at 60 ips, with the data resolved through a Hewlett-Packard X-Y plotter at a tape speed of 1⅞ ips. Velocity of the primary (impacting) pendulum was controlled for each test by fixing the height to which the pendulum was drawn back.

The module employed in these tests had four bead clamps each clamp securing one of the walls 15, 16, 17 and 18, to the closure plate 24 in order to evaluate accurately the effect of different types of venting to the atmosphere and thereby determine optimum orifice size. The results of these tests are presented in Tables 1 percentage is calculated by planimetering these areas and dividing the energy dissipated by the total energy absorbed. The configuration with the highest percentage dissipation proved to be two valves with 1 psi springs.

Also apparent in the load-stroke curves is a bulge in the initial portion of the curves caused by the buckling of the ribs and module walls during compression.

The energy absorbing capacity of the semi-pneumatic bumper with two valves is approximately 9000 ft-lbs for a 54-inch section. This is the energy absorbed in a 6 mps pendulum impact in which the bumper reached its maximum allowable stroke, i.e., the distance at which the ribs have contacted the closure plate and buckled without permanent deformation or tearing from the module walls, of 4 inches. The semi-penumatic bumpers with 11 vents were unable to absorb enough energy to withstand a 6 mph impact, and were therefore, not tested at 6 mph.

The results of Table 1 demonstrate the increased compression stiffness, i.e., decreased stroke, provided by the contained air, and the fact that such pneumatic effect can be altered and controlled by varying the amount of throttling afforded by the valve orifices.

TABLE 1

| | | PEAK STROKE - PENDULUM | | | |
|---|---|---|---|---|---|
| | Vents | | Impact Velocity | | |
| Qty. | Type | 3 mph | 4 mph | 5 mph | 6 mph |
| 0 | No vents | 1.6 in. | 2.5 in. | 3.3 in. | 3.8 in. |
| 2 | Valves with light return springs | 2.1 | 3.0 | 3.6 | 4.0 |
| 2 | Valves with no springs | 2.1 | 3.0 | 3.6 | 4.0 |
| 2 | 2-in. diameter holes | 2.1 | 3.0 | 3.6 | 4.0 |
| 11 | Valves with light return springs | 2.2 | 3.1 | 3.8 | — |
| 11 | 2-in. diameter open holes | 2.2 | 3.1 | 3.9 | — | through 4, and FIGS. 5 through 10, the load deflection curves for the 5 mph impacts.

In FIGS. 5 through 10, load is plotted against stroke. The resulting load deflection curves for the 5 mph pendulum impacts show the "hysteresis loop" loading curve characteristic of energy absorbing devices. In such a curve, the area beneath the upper (loading) portion of the curve represents the energy absorbed in the collision; the area beneath the lower (unloading) portion of the curve is the energy returned to the system; and, the area inside the loop represents the energy dissipated during the collision. The energy dissipation Table 2 shows that the two-vent bumpers had the same peak acceleration values for 3–6 mph impacts. The 11-vent bumpers had lower peak values from 3-5 mph, but were unable to withstand 6 mph impacts, as discussed hereinabove.

TABLE 2

| | | PEAK ACCELERATION - PENDULUM | | | |
|---|---|---|---|---|---|
| | Vents | | Impact Velocity | | |
| Qty. | type | 3 mph | 4 mph | 5 mph | 6 mph |
| 0 | No vents | 1.6 g | 1.9 g | 2.9 g | 4.4 g |
| 2 | Valves with light return springs | 1.3 | 1.7 | 2.7 | 4.2 |
| 2 | Valves with no springs | 1.3 | 1.7 | 2.7 | 4.2 |
| 2 | 2-in. diameter holes | 1.3 | 1.7 | 2.7 | 4.2 |
| 11 | Valves with light return springs | 1.1 | 1.6 | 2.5 | — |
| 11 | 2-in. diameter open holes | 1.1 | 1.5 | 2.4 | — |

Table 3 indicates that the vent type providing the greatest energy dissipation at all velocities was the valve with return spring designed to vent at one psi. These light springs assured positive valve closing on the rebound stroke. Valves with no return springs were a close second.

TABLE 3

| | ENERGY DISSIPATION - PENDULUM IMPACT | | | | |
|---|---|---|---|---|---|
| | Vents | | Impact Velocity | | |
| Qty. | Type | 3 mph | 4 mph | 5 mph | 6 mph |
| 0 | No vents | 55 % | 54 % | 53 % | 53 % |
| 2 | Valves with light return springs | 70 | 73 | 75 | 79 |
| 2 | Valves with no springs | 68 | 71 | 73 | 78 |
| 2 | 2-in. diameter holes | 65 | 65 | 65 | 69 |
| 11 | Valves with light return springs | 58 | 67 | 69 | — |
| 11 | 2-in. diameter open holes | 65 | 64 | 64 | — |

The pressure maximums and minimums appearing in Table 4 are indications of the effects of the various vent configurations on the system characteristics. A large negative pressure tends to increase the amount of energy dissipation by lowering the force on the rebound stroke. The presence of a negative pressure in the case of the unvented system is a result of some of the heat generated by compression of the air being absorbed by the contacting elastomer surfaces.

TABLE 4

| | PEAK PRESSURES (COMPRESSION/REBOUND) | | | | |
|---|---|---|---|---|---|
| | Vents | | Impact Velocity | | |
| Qty. | Type | 3 mph | 4 mph | 5 mph | 6 mph |
| 0 | No vents | +8 psi | +16 psi | +32 psi | +55 psi |
| | | 0 | − 1 | − 1.5 | − 2 |
| 2 | Valves with light return springs | 4.2 | 6.8 | 9.5 | 11.5 |
| | | −6 | − 7.9 | − 8.9 | −10.8 |
| 2 | Valves with no springs | 3 | 6 | 9 | 11 |
| | | −4 | − 6 | − 7 | − 9 |
| 2 | 2-in. diameter holes | 2 | 3 | 4.5 | 5 |
| | | − .5 | − 1.5 | − 2.5 | − 3.5 |
| 11 | Valves with light return springs | 1.2 | 1.3 | 1.6 | — |
| | | −5.3 | − 6.3 | − 6.7 | — |
| 11 | 2-in. diameter open holes | 0 | 0 | 0 | — |
| | | 0 | 0 | 0 | — |

For the second series of tests, the simpler flap valve depicted in FIG. 4 was employed. The bumper consisted of three modules as depicted in FIGS. 1–1A, with two valves in the center module 8, and a single valve in each of the side modules 7 and 9. Another modification, from the pendulum tests, was the omission of transverse clamps and the relevant bolts. The bumper was mounted to the 1955 GMC coach using production-type mounting brackets.

The coach was equipped with front and rear accelerometers (Statham 0–100 g strain-gage type) mounted on the frame to sense fore-aft accelerations. For accurate measurement of impact velocities, a direct-current generating fifth wheel, along with a Weston voltmeter reading in miles per hour, were mounted on either the coach or a 1973 Chevrolet passenger car weighing 4400 lbs, depending on which of these was to be the moving vehicle.

The accelerometer outputs were recorded on a 7-channel Ampex tape recorder operating a 60 ips, the data later being resolved at 1⅞ ips through a Hewlett-Packard X-Y plotter, as in the pendulum tests.

Maximum acceleration values for the various impacts were obtained by taking the greatest average acceleration over any 0.020 second interval during that impact. Impact durations ranged from 0.15 to 0.19 seconds. Acceleration values for five tests, A–E are presented in Table 5, hereinbelow. Stroke could only be determined during impact of the bumper into the concrete barrier and therefore, appears only in Test E.

Test A

A 4400 pound 1973 Chevrolet was impacted straight forward into the center of the semi-pneumatic bus bumper at speeds from 5 to 8 mph with the coach braked. There was no damage to either the car, the coach, or the semi-pneumatic bumper.

Test B

The 1973 Chevrolet was impacted at 5 mph into the corner of the bus bumper at 30° off the coach centerline. There was no damage to either vehicle.

Test C

The 1955 GMC coach was impacted into the rear ends of 1971 Ford taxicabs (weight approximately 3900 pounds)) at 15 and 17.5 mph. The taxis were considerably damaged. There was no damage to the coach or the bumper.

Test D

For comparative evaluation, the bus with its steel bumper was impacted into the rear end of another 1971 Ford taxicab (weight approximately 3900 pounds) at 17.5 mph. The taxicab was considerably damaged and damage to the coach and the bumper was observed.

Test E

The bus was impacted straight into a fixed concrete barrier at 4.3 and 5 mph. There was no damage to the barrier, the bus or its bumper.

TABLE 5

VEHICLE SEMI-PNEUMATIC TEST (FLAP VALVES)

| Type Impact | mph | Front G (Max) | Rear G (Max) | Front Stroke (Max) |
|---|---|---|---|---|
| 1973 Chevrolet into bus — head-on | 5 | .35 | .40 | — |
|  | 6 | .61 | .85 | — |
|  | 7 | .75 | .95 | — |
|  | 8 | .95 | 1.3 | — |
| 1973 Chevrolet into bus 30° off centerline | 5 | .28 | .35 | — |
| Bus into 1971 taxi rears | 15 | 1.2 | 2.0 | — |
|  | 17.5 | 1.5 | 2.3 | — |
| Bus w/steel bumper into 1971 taxi rear | 17.5 | 2.9 | 2.3 | — |
| Bus into fixed barrier | 4.3 | 2.3 | 3.2 | 3.4 |
|  | 5 | 2.6 | 3.9 | 4.1 |

Pendulum tests indicated that control of the airflow out of the bumper section during impact is necessary to achieve optimum load stroke efficiency and energy dissipation. The two-valve configuration on the (center) 54-inch module was the most effective variation tested. The results of the vehicle tests on the bumper, using this valve configuration, showed that considerable protection is provided to the 19,200 pound GMC coach by this system. Inasmuch as the kinetic energy of a collision is directly proportional to the mass of the moving vehicle and to the square of its velocity, the bumper might be expected to provide equal protection to lighter-weight vehicles at somewhat higher collision velocities. For example, a vehicle weighing half as much as the 19,200 pound test bus, could be expected to sustain impacts 1.414 (the square root of 2) times the velocities reported without damage either to the bumper or to the structure of the vehicle on which it is mounted.

Thus it should be evident that the disclosed semi-pneumatic bumper system carries out the objects of the invention set forth above. As will be apparent to those skilled in the art, many modifications can be made without departing from the spirit of the invention herein disclosed and described, the scope of the invention being limited solely by the scope of the attached claims.

What is claimed is:

1. A semi-pneumatic energy absorbing and dissipating bumper system for interposition between two objects at least one of which is movable comprising:
   elastomeric module means having an impacting face, upper, lower and side walls terminating in a continuous bead;
   support means for mounting said module means on at least one of said objects including
      a closure plate upon which said module means is mounted and
      a backup structure carrying said closure plate;
   a plurality of internal reinforcing ribs connecting only said impacting face to said upper and lower walls and terminating in a rear edge the configuration of which avoids contact with said closure plate prior to impact of said module means with an object;
   means for holding at least a portion of said continuous bead against said closure plate to form a cavity therebetween closed to the atmosphere; and,
   means for permitting selective communication between said cavity and the atmosphere upon the application of an external force of predetermined magnitude to said module means; said means including
      valve means in said closure plate opening to the atmosphere upon an increase of pressure within said module means and
      a space between at least one of said walls of said module means and said closure plate formed during impact of said module means by the escape of air from therein.

2. A semi-pneumatic energy absorbing bumper system, as in claim 1, wherein said elastomeric module means is a polyurethane composition.

3. A semi-pneumatic energy absorbing bumper system, as in claim 1, wherein said means for holding a portion of said continuous bead against said closure plate comprises:
   bead clamping means for engaging at least said upper and lower walls of said module means opposite said closure 4. A semi-pneumatic energy absorbing bumper system, as in claim 1, further comprising:
   mounting means communicating with said support means for attaching said bumper system to a vehicle.

5. A semi-pneumatic energy absorbing and dissipating bumper system for interposition between two objects at least one of which is movable comprising:
   elastomeric module means having an impacting face, upper, lower and side walls terminating in a continuous bead;
   support means for mounting said module means on at least one of said objects including
      a closure plate upon which said module means is mounted and
      a backup structure carrying said closure plate;
   a plurality of internal reinforcing ribs connecting only said impacting face to said upper and lower walls and terminating in a rear edge the configuration of which is spaced from sealing contact with said closure plate prior to impact of said module means with an object;
   means for holding at least a portion of said continuous bead against said closure plate to form a cavity therebetween closed to the atmosphere; and,
   means for permitting comunication between said cavity and the atmosphere upon the application of an external force of predetermined magnitude to said module means; said means including
      valve means in said closure plate opening to the atmosphere upon an increase of pressure within said module means and
      a space between between at least one of said walls of said module means and said closure plate formed during impact of said module means by the escape of air from therein.

* * * * *

UNITED STATES PATENT OFFICE
CERTIFICATE OF CORRECTION

Patent No. 3,989,292      Dated November 2, 1976

Inventor(s) Thomas A. Bank, Jack E. Gieck and David A. Weitzenhof

It is certified that error appears in the above-identified patent and that said Letters Patent are hereby corrected as shown below:

Column 1, line 50; Delete "bumpoer" - insert instead ... bumper ...

Column 3, line 58; After "the" and before "and" - insert ... cavity ...

Column 5, line 62; Delete "claim" - insert instead ... clamp ...

Column 12, line 52; Delete "oif" - insert instead ... of ...

Column 14, line 25; After "closure" add ... plate and attached to said closure plate by fastening means ...

Column 14, line 58; Delete "between", second occurrence.

Signed and Sealed this

Thirteenth Day of December 1977

[SEAL]

Attest:

RUTH C. MASON
Attesting Officer

LUTRELLE F. PARKER
Acting Commissioner of Patents and Trademarks